United States Patent [19]

Frank et al.

[11] 4,162,832
[45] Jul. 31, 1979

[54] EXPOSURE CONTROL WITH PIEZOELECTRIC LATCH CONTROL

[75] Inventors: Lee F. Frank; James K. Lee, both of Rochester, N.Y.

[73] Assignee: Eastman Kodak Company, Rochester, N.Y.

[21] Appl. No.: 851,321

[22] Filed: Nov. 14, 1977

[51] Int. Cl.² .................. G03B 7/08; H01R 39/08
[52] U.S. Cl. .................... 354/51; 310/332; 354/234
[58] Field of Search ............ 354/50, 60 R, 51, 142, 354/234, 235, 271, 135; 350/269, 161 R; 310/331, 332

[56] References Cited

U.S. PATENT DOCUMENTS

| 3,110,824 | 11/1963 | Flanagan | 354/271 X |
| 3,205,799 | 9/1965 | Burgarella | 354/51 |
| 3,980,908 | 9/1976 | McClintock | 354/235 X |

FOREIGN PATENT DOCUMENTS 1365560 9/1974 United Kingdom .

Primary Examiner—Michael L. Gellner
Attorney, Agent, or Firm—Warren W. Kurz

[57] ABSTRACT

A camera is disclosed which includes a shutter blade magnetically latchable in an open position to permit scene light to pass through a camera aperture, flexible piezoelectric energy converter, such as a Bimorph element, movable upon being subjected to an applied voltage to push the shutter blade away from the magnet, and a light responsive electronic circuit for applying a voltage to the piezoelectric converter after an exposure duration in accordance with the level of scene illumination.

10 Claims, 5 Drawing Figures

EXPOSURE CONTROL WITH PIEZOELECTRIC LATCH CONTROL

CROSS-REFERENCE TO RELATED APPLICATIONS

Reference is made to commonly assigned, copending U.S. patent applications Ser. No. 816,776, entitled PIEZOELECTRIC CAMERA SHUTTER, filed in the names of L. F. Frank and J. K. Lee on July 18, 1977 and Ser. No. 816,835, entitled TIMED PIEZOELECTRIC SHUTTER CONTROL FOR CAMERAS, filed in the names of L. F. Frank and J. K. Lee on July 18, 1977.

BACKGROUND OF THE INVENTION

1. Field of the Invention

The present invention relates to exposure-control devices for use in photographic apparatus, and more particularly to shutter-control devices for automatically establishing exposure time in accordance with the level of scene illumination.

2. Description of the Prior Art

Two-bladed camera shutters are well-known, and many include closing blades which are spring-biased toward a closed position and are held in an open position by magnetic force. Upon reduction of the magnetic attractive force applied to the blade, the spring moves the blade to an aperture-closing position to terminate exposure.

U.S. Pat. No. 3,205,799 and British Pat. No. 1,365,560 show different approaches for releasing the magnetically held closing blade. In the U.S. patent, an electromagnet holds the closing blade when energized and, upon a decrease in the electromagnet coil current, releases the blade. The British patent provides a permanent magnet for retaining the closing blade in an open position. To terminate an exposure, an electromagnet coil is energized to overcome the magnetic attraction between the permanent magnet and the closing blade.

It would appear that either of these prior-art camera designs would work satisfactorily in cameras of ordinary exposure intervals. However, because current does not change instantaneously in an electromagnetic coil, exposure control apparatus of the type described above will have a response time related to the relevant time constants. In some applications, such as use with high speed shutters, the response time may render such apparatus incapable of providing accurate exposure control. For that reason, we have provided a fast-acting piezoelectric motor for slightly separating the shutter blade from the magnet holding it open such that the magnetic force is reduced sufficiently to be overcome by a spring force urging the closing blade to an aperture-closing position.

Apparatus in which a flexing-type piezoelectric element is used to terminate an exposure interval is disclosed in commonly assigned, copending U.S. patent applications Ser. No. 816,776, entitled PIEZOELECTRIC CAMERA SHUTTER, filed on July 18, 1977 and Ser. No. 816,835, entitled TIMED PIEZOELECTRIC SHUTTER CONTROL FOR CAMERAS, filed on July 18, 1977. In the latter application, a shutter-control device is disclosed in which a closing shutter blade mechanically latches in an open position during an exposure and is unlatched when a voltage is suddenly applied to a piezoelectric Bimorph element to rapidly change its shape. The Bimorph element flexes rapidly to "fling" the latch open to release the closing blade so that the shutter closes.

Although such a mechanism is highly accurate with respect to shutter speed, the manufacturing and assembly tolerances of the closing blade latch are important to successful operation so that the latch securely holds the blade yet quickly releases the blade when flung open. Further, such latches have exhibited problems associated with wear of parts which slide against one another. By the present invention, we have provided a more easily assembled and more durable device for holding the closing blade and for releasing it upon sudden application of an electrical voltage.

SUMMARY OF THE INVENTION

In accordance with the present invention, there is provided a camera having a magnet and a shutter blade which is latched-in an open position by magnetic force during an exposure. The shutter blade is moved away from the magnet to unlatch the blade and terminate the exposure in response to a change in shape of a flexing-type piezoelectric motor element such as a Bimorph element. The change in shape of the motor element is caused by change in an electrical signal applied to the motor element in accordance with the completion of the exposure interval.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Piezoelectricity is a well known phenomenon exhibited by certain crystalline and ceramic elements. When such elements are compressed or extended in particular directions, electric charges of opposite signs are produced at opposite ends of the element. Not only is an electric moment induced in piezoelectric element by an application of mechanical stress or strain, there is also a converse effect; namely, on applying an electric field, the element changes shape by expansion in one direction and contraction in another. A fuller discussion of the direct and converse effects may be found in *Encyclopaedic Directory of Physics*, Pergamon Press, 1962, pages 503–505.

A flexing-type piezoelectric element such as a Bimorph element is a member composed of two strips of piezoelectric material joined together (such as by cement) with the direction of expansion of one strip aligned with the direction of contraction of the other such that the application of an electric potential to both strips causes one to expand and the other to contract, thus producing a bending of the combination. Until the potential difference is removed, the Bimorph element will remain bent. If a Bimorph element is physically bent, an electric potential difference tending to return the Bimorph element to its original configuration will develop from one strip to the other strip. That potential difference will remain until externally removed or the Bimorph element is unflexed. If the Bimorph element is bent and the thus created potential difference dissipated, such as by shorting or through a load, the unbending of the Bimorph element by external force or its own internal spring force will produce an electric potential of a polarity opposite that of the original potential produced when the Bimorph element was first bent. This potential will resist the forces (e.g., internal spring force) tending to return the bimorph to its original configuration.

The drawings illustrate the operating principal of cameras incorporating a preferred embodiment of the present invention. Because cameras are well known, the present description will be directed in particular to elements forming part of, or cooperating more directly with, the present invention. Camera elements not specifically shown or described may take various forms well known to those skilled in the art.

Figure 1:
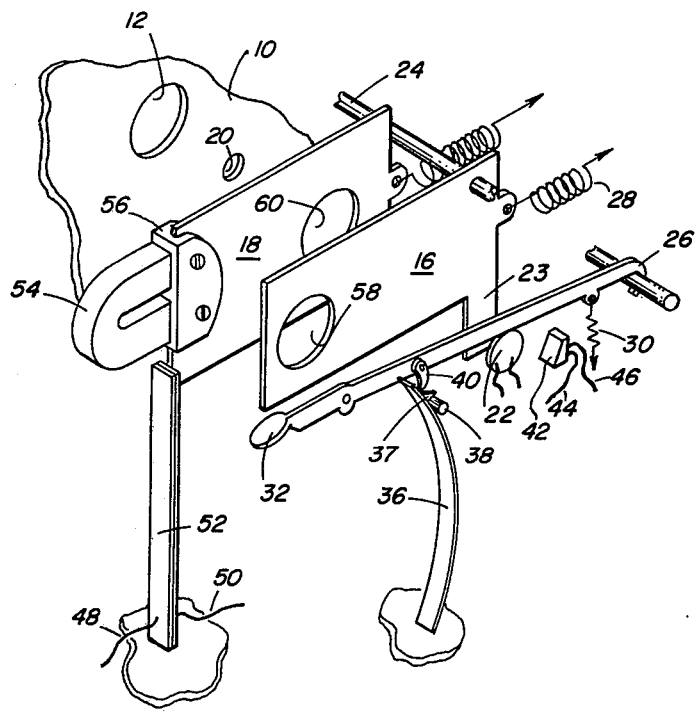
FIG. 1 is a perspective schematic view of a portion of a camera in accordance with a preferred embodiment of the present invention.

Referring to the drawings, and specifically to FIG. 1, a camera housing 10 has an aperture 12 for focusing an image to be photographed at the camera's film plane, not shown. Between the aperture and the film plane, a pair of shutter blades 16 and 18 are spring-urged to the right as shown. A second aperture 20 in housing 10 is aligned with a photoresponsive element 22 (FIGS. 1 and 2) of exposure-control electronics. Light, passing through aperture 20, is normally blocked from the photoresponsive element by a tab 23 on shutter blade 16, but reaches the element when the blade moves to the right to initiate exposure, as will be explained hereinafter.

Shutter blade 16 has a reset bar 24 which is engaged by a latch member 26 to hold the blade in an aperture-closing position against the force of spring 28. Latch member 26 is held down by a spring 30 such that manual depression of end portion 32 rotates latch member 26 to release reset bar 24.

A strip of spring steel 36 is cantilever-mounted to housing 10 and carries a hammer 37 at its free end. As will be explained hereinafter, a pin 38 coupled to reset bar 24 in any convenient manner cocks spring strip 36 to its FIG. 1 position where it is held by a latch 40 on member 26. A piezoelectric generator element such as a crystalline or ceramic transducer 42 is positioned in the path of hammer 37 of strip 36.

Figure 2:
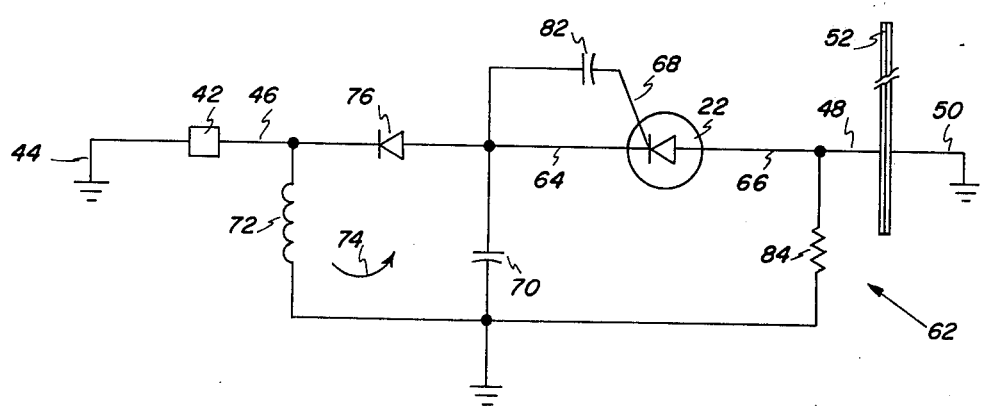
FIG. 2 is a diagram of the timing circuit for the camera of FIG. 1.

Piezoelectric generator element 42 is electrically connected by leads 44 and 46 to an electronic shutter-control circuit which will be more fully described with respect to FIG. 2. Also connected to the shutter-control circuit, by leads 48 and 50, is a flexing-type piezoelectric Bimorph motor element 52 fixed at its lower end to housing 10.

The upper end of Bimorph motor element 52 contacts, or is in close proximity to, the leftmost edge of closing-shutter blade 18. Above Bimorph motor element 52, a fixed, permanent magnet 54 cooperates with a magnetizable keeper 56 screwed onto blade 18 to hold the blade in its illustrated, FIG. 1 position. Magnet 54 and keeper 56 are shown schematically in the drawings. In practice, the magnetic latch means should be proportioned to present a high holding force against movement of blade 18, and a rapidly diminishing force as the distance between the magnet and the blade increases. Blades 16 and 18 are provided with apertures 58 and 60, respectively, as is conventional.

Referring now to FIG. 2, a shutter-control circuit 62 is shown in a preferred form. The circuit includes a light-activated silicon-controlled rectifier (LASCR) 22, also known as a "Photo SCR." This is a standard electronic component well-known to those skilled in the art. However, if additional information is desired, the reader is referred to *Reference Data for Radio Engineers*, H. W. Sams & Co., 6th, 1975, page 19-15, for general information on silicon-controlled rectifiers, and to *General Electronic Optoelectronics Manual*, W. H. Sahn, 1976, pages 5-7, for information specifically on LASCR's.

In general, LASCR 22 presents a very high resistance to current flowing from lead 64 (the cathode side) to lead 66 (the anode side). However, once a predetermined potential difference has been established between the cathode and the LASCR's gate 68, the LASCR triggers and current flows through it from cathode to anode. The gate voltage of a LASCR will leak through that device to create a photocurrent which is a function of the light intensity falling upon the LASCR. It will be recalled that LASCR 22 is aligned with aperture 20, FIG. 1, of housing 10 and is shielded from light entering the aperture by opening shutter blade tab 23 when the blade is latched in its FIG. 1 position. Assuming that the photo-current is at a predetermined minimum value, the LASCR will trigger when the cathode-to-gate voltage reaches a threshold voltage.

When piezoelectric transducer element 42 is struck, it develops a negative voltage and thereupon looks to the rest of circuit 62 like a capacitor with a given impedance. It is desired to transfer the voltage from the transducer element to a capacitor 70 for storage. However, energy exchange between two capacitors is imperfect. Even at best, when the capacitors are of equal value, the final energy of the combination is only half that originally in the generator. However, there is a substantially perfect exchange of energy between a pure inductor, which stores energy determined by the current through it, and a pure capacitor, which stores energy determined by the voltage across it. Therefore, we have provided a coupling inductor 72 in parallel with the transducer element and capacitor 70 so that, as the voltage across the transducer element goes down, the current in the inductance goes up, and then as the current in the inductance goes down, the voltage across the capacitor goes up. Assuming no resistance, no energy is lost in such transfers.

Accordingly, the high voltage generated by piezoelectric transducer element 42 is transferred to inductor 72 in the form of current, and current begins to flow in the tuned or "tank" circuit of the inductor and capacitor 70 in the direction of an arrow 74. As the energy stored in the inductor goes down, the voltage over capacitor 70 goes up. A diode 76 prevents the flow of energy from reversing once capacitor 70 is fully charged.

OPERATION

Figure 3:
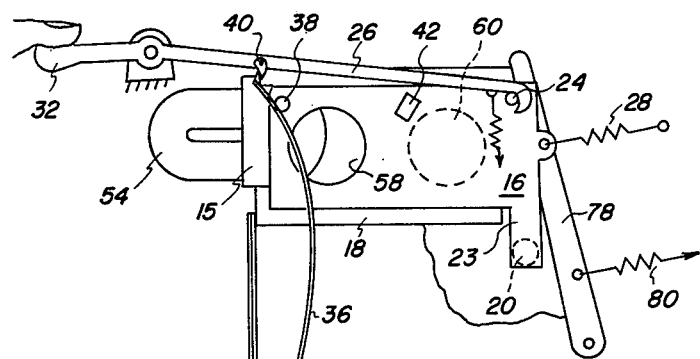
FIGS. 3–5 are successive views of the elements of the camera of FIG. 1 as they progress through an exposure cycle.
Figure 4:
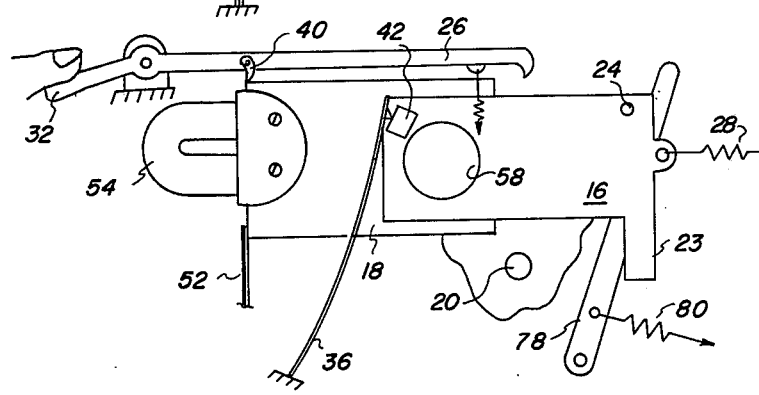
Figure 5:
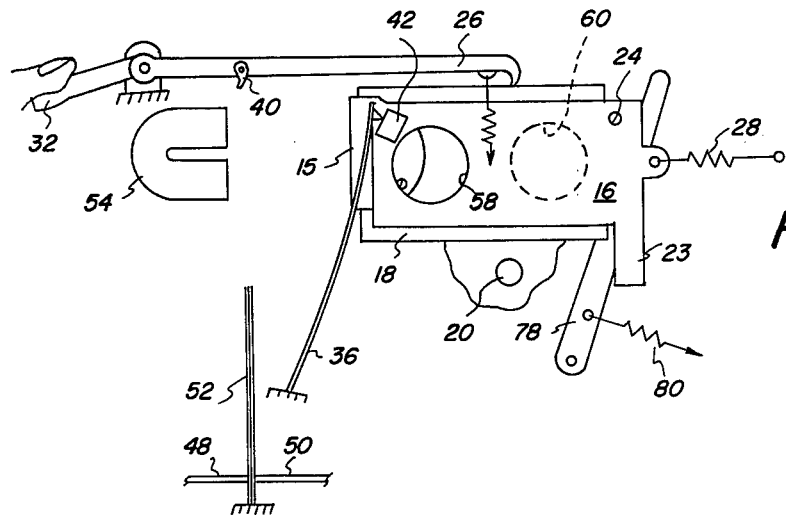

FIGS. 3-5 show the camera elements in their various positions during a complete exposure cycle. In FIG. 3, the camera is shown cocked, a crank arm 78 having been rotated against the force of a spring 80 to push reset bar 24 (and thereby both shutter blades) to the left. To begin an exposure, the operator actuates end portion 32 to rotate latch member 26 and thereby free opening blade 16 for movement to the right until its aperture is aligned with both taking aperture 12 and closing blade aperture 60 to initiate exposure. Simultaneously, latch member 40 frees spring strip 36 so that hammer 37 carried by strip 36 impacts upon piezoelectric transducer generator 42, creating the electrical voltage for circuit 62. FIG. 4 shows the apparatus during an exposure.

The electrical voltage transferred to capacitor 70 as explained hereinbefore is presented at the cathode of LASCR 22. Because capacitor 82 is effectively a short for a transient signal, the gate and the cathode will initially be at substantially the same potential and the anode-cathode current through the LASCR will be minimal.

When the LASCR is exposed to light by the removal of tab 23 from alignment with aperture 20, a photocurrent "I" is initiated from the gate electrode. The photocurrent is a function of the light intensity falling upon the LASCR, and begins to charge capacitor 82 according to the equation:

$$dv/dt = I/C,$$

where C is the value of capacitor 82. Once the potential difference between the gate and the cathode (the voltage built up over capacitor 82) has reached the threshold value, the LASCR triggers, permitting current to pass. Accordingly, when the LASCR triggers, motor Bimorph 52 will be rapidly charged. As will be explained, this rapid charging of Bimorph 52 results in termination of the exposure interval. Therefore, the shutter speed is directly dependent upon the LASCR's photocurrent, which is in turn dependent upon the intensity of scene light. A residual voltage on the Bimorph generator must be removed prior to the next exposure cycle, and a resistor 84 is provided for that purpose.

Of course, LASCR 22 is only one of several suitable devices for delaying the transient signal. For instance, the LASCR may be replaced by an SCR and a photoconductive element for regulating the current through capacitor 82.

As mentioned above, exposure termination is controlled by Bimorph 52. The rapidly charging motor Bimorph 52 bends in the direction of closing shutter blade 18 to push the blade away from permanent magnet 54. As soon as keeper 56 is sufficiently spaced from the magnet, the magnetic attractive force is reduced to a level where it is overcome by the force of spring 86 and the blade snaps to an aperture-closed position illustrated in FIG. 5.

The invention has been described in detail with particular reference to a preferred embodiment thereof, but it will be understood that variations and modifications can be effected within the spirit and scope of the invention.

I claim:

1. In exposure control apparatus for use in a camera of the type having (a) an aperture, (b) a shutter blade having an aperture-open position and an aperture-closing position, and (c) spring means for urging the shutter blade toward its aperture-closing position, the improvement comprising:

magnet means for holding the shutter blade against the force of the spring means when the shutter blade is in its aperture-open position;

a piezoelectric motor element, movable upon being subjected to an electrical voltage, for pushing said shutter blade away from said magnet means, whereby said shutter blade will move to its aperture-closing position under the influence of the spring means; and light-responsive means for applying an electrical voltage to said element after a time delay dependent on the level of scene illumination.

2. Apparatus as defined in claim 1 wherein said piezoelectric motor element is of the flexing type.

3. Apparatus as defined by claim 1 wherein:

said pushing element is a flexing-type piezoelectric motor element; and said light-responsive means is adapted to apply electrical voltage suddenly to said motor element.

4. In photographic apparatus having (a) an aperture and (b) shutter means positionable for selectively blocking and unblocking the aperture, the improvement comprising:

magnetic means for holding said shutter means in its aperture unblocking position;

means, including an electrical circuit, for producing a transient electrical signal after an exposure period which varies with the level of scene illumination; and actuatable piezoelectric motor element means electrically connected to said transient signal-producing means and adapted, in response to a transient electric signal, to change shape suddenly for moving the shutter away from said magnetic means.

5. Apparatus as defined in claim 4 wherein said piezoelectric motor element means includes a flexing-type piezoelectric element.

6. Apparatus as defined in claim 4 wherein said transient signal producing means comprises:

a source of electrical voltage; and electrical means, exposed to scene light, for (a) receiving said electrical voltage from said source, (b) initially presenting a high resistance to said voltage and (c) presenting a low resistance to said voltage after an exposure period determined by scene illumination.

7. Apparatus as defined in claim 6 wherein said electrical means includes a light-activated silicon-controlled rectifier.

8. Apparatus as defined in claim 6 wherein said source is a piezoelectric generator element.

9. Apparatus as defined in claim 4 wherein said transient signal producing means comprises:

a piezoelectric generator element which produces a voltage when deformed;

capacitor means adapted to receive and store said voltage; and means electrically interconnecting said generator element and said capacitor means for transferring voltage therebetween, said transferring means including a coupling inductor.

10. Apparatus as defined in claim 9 wherein said coupling inductor is connected across said generator element and across said capacitor means.